(No Model.) 3 Sheets—Sheet 2.
J. F. C. FARQUHAR & W. OLDHAM.
APPARATUS FOR FILTERING LIQUIDS.
No. 297,364. Patented Apr. 22, 1884.
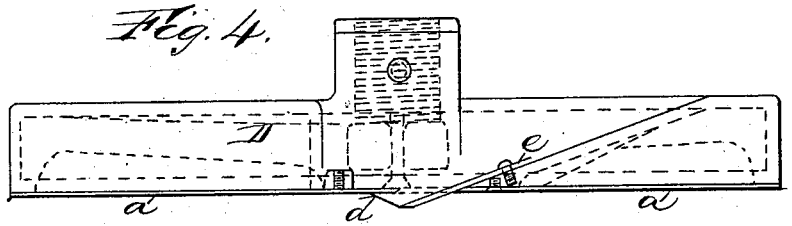
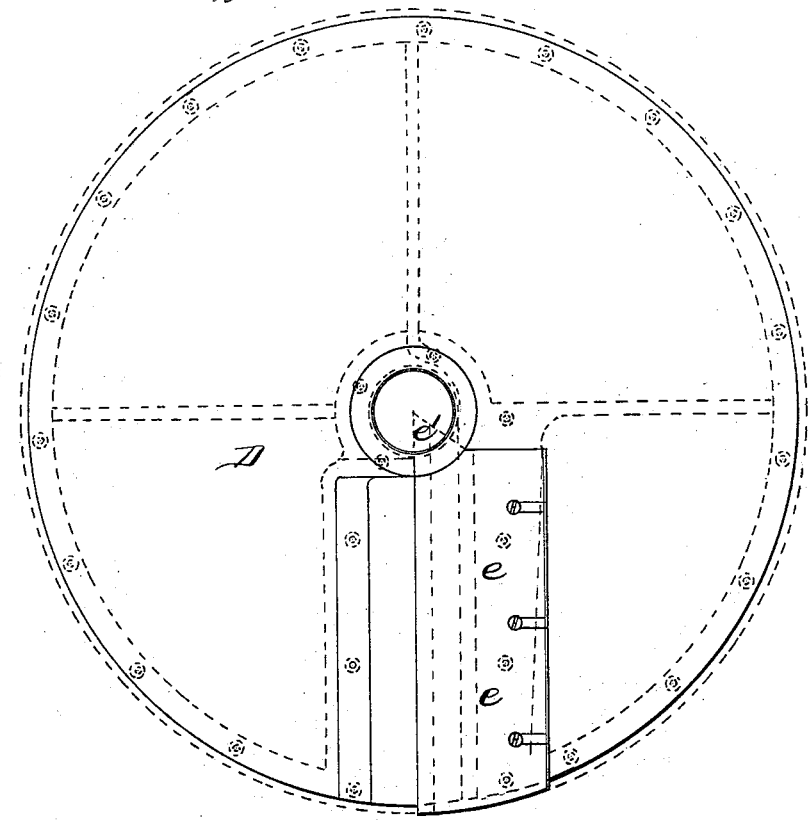

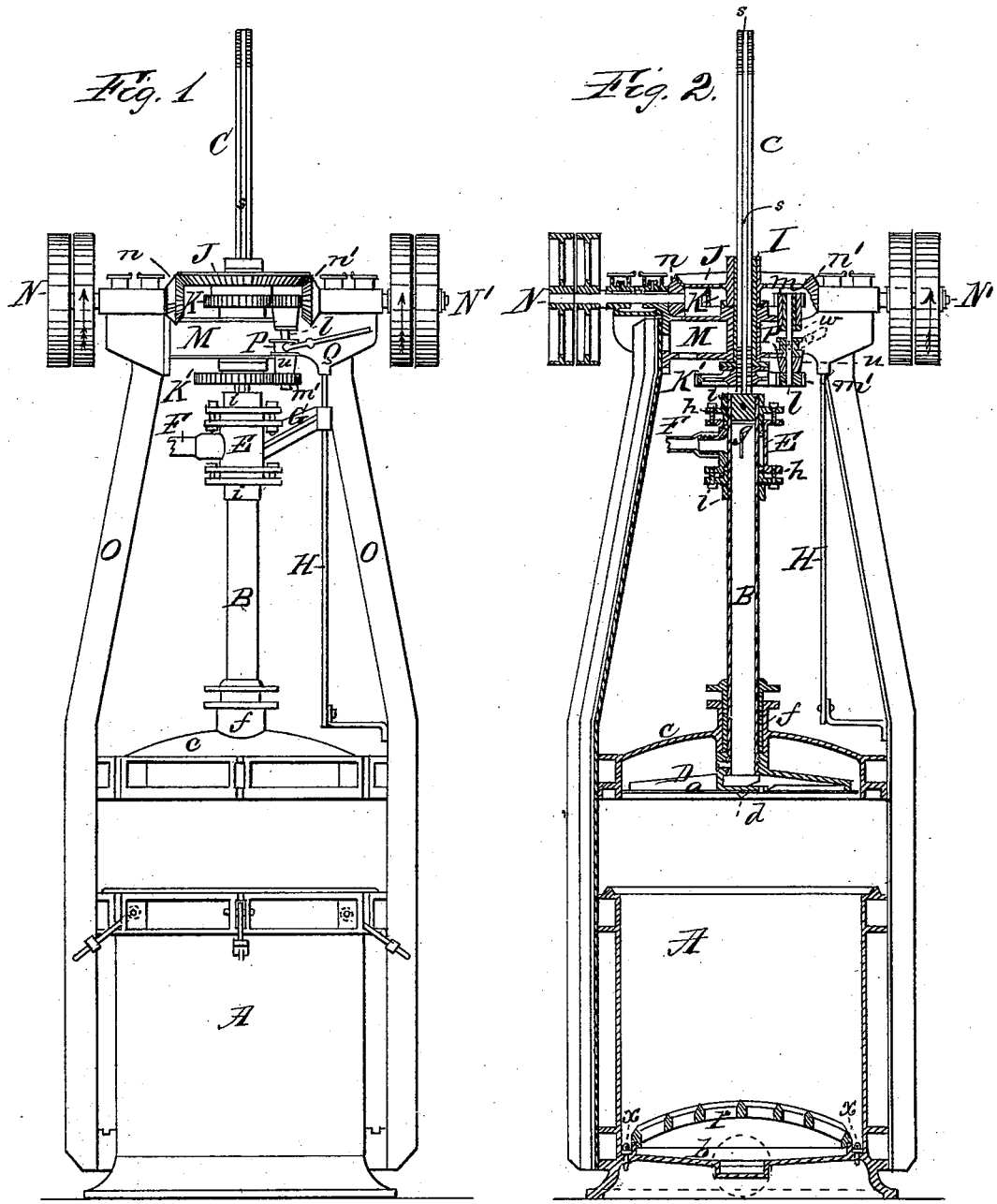

(No Model.) 3 Sheets—Sheet 3.
J. F. C. FARQUHAR & W. OLDHAM.
APPARATUS FOR FILTERING LIQUIDS.
No. 297,364. Patented Apr. 22, 1884.
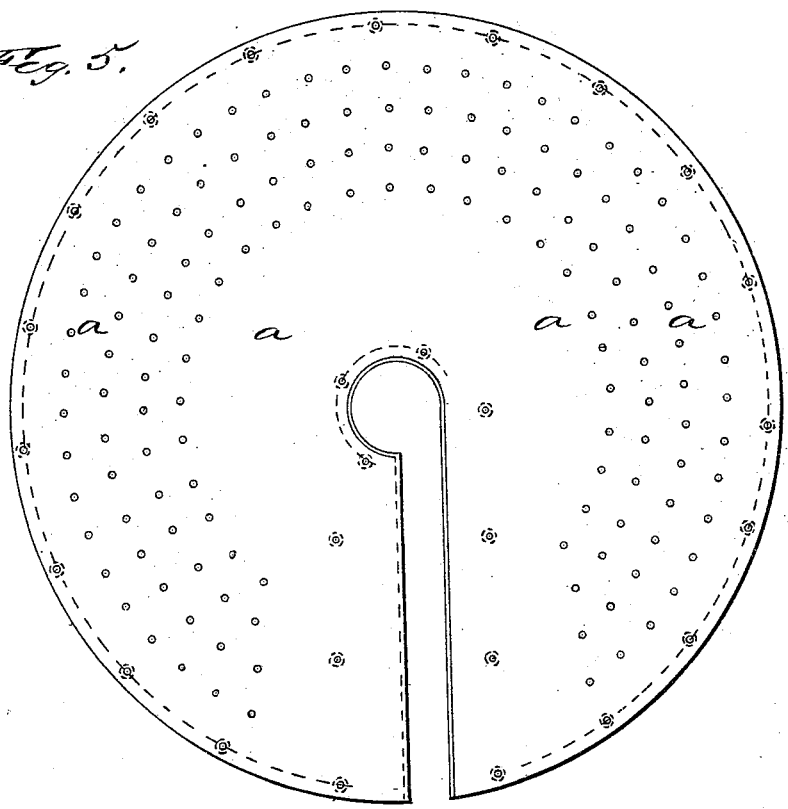
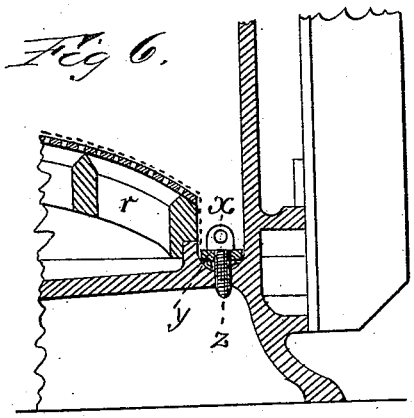

UNITED STATES PATENT OFFICE.

JOHN FREDERICK COOKE FARQUHAR AND WALTER OLDHAM, OF LONDON, ENGLAND.

APPARATUS FOR FILTERING LIQUIDS.

SPECIFICATION forming part of Letters Patent No. 297,364, dated April 22, 1884.

Application filed July 7, 1883. (No model.) Patented in France December 19, 1881, No. 146,417; in England August 25, 1882, No. 4,072; in Belgium September 19, 1882, No. 59,054; in Germany October 27, 1882, No. 21,976; in Italy November 10, 1882, No. 14,752; in Canada May 5, 1883, No. 16,820, and in Brazil July 21, 1883, No. 74.

*To all whom it may concern:*

Be it known that we, JOHN FREDERICK COOKE FARQUHAR and WALTER OLDHAM, both of London, England, at present residing in Paris, France, have made an invention of certain new and useful Improvements in Apparatus for Filtering Liquids; and we do hereby declare that the following, taken in connection with the accompanying drawings, is a full, clear, and exact description and specification of our said invention.

Our invention relates to the class of filtering apparatus described in the United States Patent No. 243,233; and its objects are to enable the cost of the apparatus to be reduced and its efficiency increased.

To these ends our invention consists of certain new and useful combinations of the members of the filtering apparatus, which are recited in the claims at the close of this specification.

In order that the same may be fully understood, we have represented in the accompanying drawings a filtering apparatus embodying our invention in the best form at present known to us, and we will proceed to describe the same, it being understood that the said filtering apparatus may be modified, without ceasing to embody one or more parts of the invention claimed, as particular circumstances or the views of different constructers or users of the invention render expedient.

Figure 1:
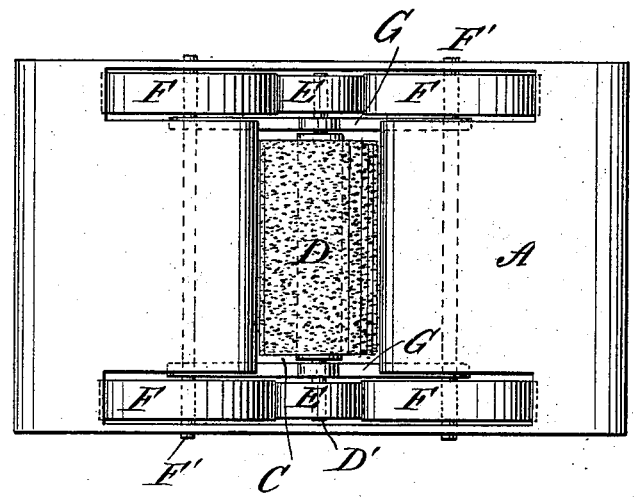
Figure 2:
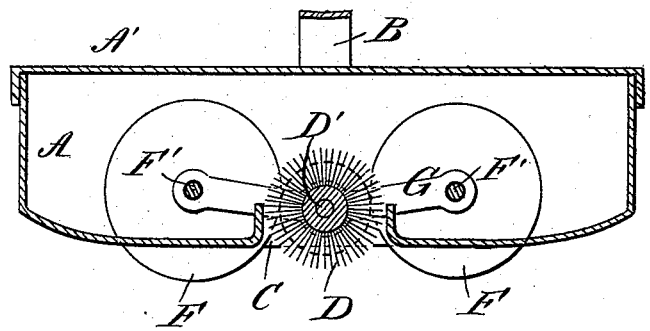

Figure 1 of said drawings represents an elevation of said apparatus with the cover raised. Fig. 2 represents a view of the same mainly in section. Fig. 3 represents a plan of the cutter-head. Fig. 4 represents a side view of the same. Fig. 5 represents a plan of the under side of the cutter-head. Fig. 6 represents a section of a fraction of the bottom of the apparatus.

The last four figures are drawn upon larger scales than the first two, and the holes of the perforated plate in Fig. 6 have been represented unduly large, so that they may be seen.

The said apparatus has a filtering-chamber, A, of cylindrical form, to contain the bed of filtering material. This chamber is closed at its lower end by a bottom, $b$, and is closed at its upper end by a removable head or cover, $c$. Within the said chamber is the movable cutter-head D, by means of which the liquid to be filtered is distributed and the foul matter which is separated from the liquid is removed. The said cutter-head consists of a hollow disk fitting loosely in the filter-chamber A and provided with the paring-blade $e$. The paring-blade is set with its cutting-edge protruding slightly below the under surface of the plate which forms the bottom of the cutter-head, and it is secured by bolts, so that it may be readily set up when worn away by grinding its edge, or may be adjusted to remove a thicker or thinner paring from the surface of the filter-bed. The paring-blade is secured in an opening formed in the cutter-head for that purpose, and the bottom plate, $a$, of the cutter-head is perforated with small holes sufficient in the aggregate for the discharge of the liquid to be filtered. By constructing the cutter-head hollow and with a perforated bottom, the liquid to be filtered is distributed substantially uniformly over the filter-bed, and the plowing up of the latter by a forcible discharge of a large mass of liquid at any one point is prevented. The cutter-head is provided with a tubular piston-rod, B, by which it may be revolved, raised, and lowered, and through which it is supplied with the liquid to be filtered. The central part of the bottom of the cutter-head is constructed with a conical boss, $d$, which projects as low as the cutter-blade, and the inner corner, $e'$, of the paring-blade is skewed and extended radially into an opening in said boss, so that the blade may pare the filtering-bed up to its center, or thereabout.

The tubular piston-rod B is passed through a stuffing-box, $f$, in the cover of the filtering-chamber, and is connected at its outer end with the screw C, through which the power is applied to the piston-rod. In previous machines made by us the supply of liquid was effected through the said screw, which plan involved the cost of boring it, so as to make t tubular. According to our present invention, the supply of liquid is applied directly to the tubular piston-rod B between the screw C and the filtering-chamber A, thus obviating the necessity and expense of making the screw hollow, and enabling the screw to be made solid and of smaller diameter than the tubular piston-rod. For this purpose the tubular piston-rod is perforated with feed-holes $g$, to admit the liquid through its walls, and the perforated portion is surmounted by a movable supply-chest or feed-chest, E. This feed-chest is constructed with stuffing-boxes $h\ h$ at its upper and lower ends, and is fitted between collars $i\ i$, applied to the piston-rod B, so that while the piston-rod may turn in the feed-chest the latter is caused to move up and down with the piston-rod, and to maintain its proper relationship to the feed-holes $g$ of said rod. The feed-chest is supplied with liquid from an elevated reservoir or from a force-pump by means of a flexible hose, F, connected with a nozzle, $o$, of the feed-chest; and in order that the hose may not be wound upon the piston-rod when it is revolved, a slide, G, and guide H are provided to keep the feed-chest from revolving, while permitting it to move up and down with the piston-rod.

In order that the revolving head may be turned axially, and may also be raised and lowered, the screw is combined with a nut and gearing, which are secured to a cross-head, M, which is connected with the filtering-chamber by uprights O O. The nut I is fitted to the screw C, and is fitted to revolve in a bearing in the cross-head, its endwise motion therein being prevented in an upward direction by a collar at the lower end of the nut, and being prevented in a downward direction by the hub of the beveled wheel J, which is secured upon the upper end of said nut. The beveled wheel J is driven by either of two pinions, $n\ n'$, whose shafts N N' are fitted with fast and loose belt-pulleys, so that when the driving-belt of one shaft and pinion (N $n$, for example) is on the fast pulley thereof, the driving-belt of the other shaft and pinion (N' $n'$) is on the loose pulley thereof. One driving-pinion, $n$, may thus be used to drive the screw-nut I in one direction, and the other pinion, $n'$, to reverse the movement of the said nut.

The beveled wheel J, which is fast to the nut I, has a cog-wheel, K, secured to it, whose teeth engage with those of a pinion, $m$, whose hub or sleeve $w$ is mounted loosely upon a pinion-shaft, $l$, that is fitted to revolve in the cross-head M. This pinion-shaft has a second pinion, $m'$, secured to it, with its teeth engaged with those of a counter cog-wheel, K', which has one tooth less than the wheel K has, and whose hub is arranged to turn freely upon the lower end of the screw-nut I. This hub is provided with a key or spline, which is fitted to a groove, $s$, of the screw. The pinion-shaft $l$ is fitted with a sliding clutch, P, which is manipulated by a forked lever, Q, and has clutch-teeth of the ordinary construction at each of its ends, the clutch being connected with the pinion-shaft $l$ by a spline and a groove. The upper clutch-teeth are adapted to be engaged with corresponding clutch-teeth on the lower end of the sleeve $w$ of the upper pinion, $m$, and the lower clutch-teeth are adapted to be engaged with corresponding teeth on the end of the lower fixed bearing, $u$, in which the pinion-shaft revolves; hence when the clutch is depressed, as in Fig. 1, the engagement of the clutch-teeth with the fixed bearing $u$ holds the lower pinion, $m'$, and the wheel K' (which it controls) stationary, thereby preventing the screw and cutter-head from turning axially, and consequently the turning of the nut I in one direction by one of the driving-pinions, $n'$, will then screw the cutter-head rapidly downward to the surface of the bed of filtering material placed in the chamber A, while if the clutch P be shifted so as to engage its upper teeth with the pinion-sleeve $w$, and the nut be driven by the pinion $n$, the cutter-head, with its screw, will be caused to revolve by the action of the pinion $m'$ and wheel K' slightly faster than the nut I is revolved in the direction to raise the cutter-head, and consequently the cutter-head, while being revolved in a direction to pare the filter-bed, will be screwed slowly downward in the filtering-chamber A. The speed at which the cutter-head is thus caused to descend depends upon the difference between the number of the teeth of the wheels K K' of the differential gearing K K' $m\ m'$, which may be varied by increasing or decreasing the number of cog-teeth, as found expedient. If, on the other hand, the nut I be revolved by the wheel N and pinion $n$ while the clutch is engaged with the fixed bearing $u$, the cutter-head will be raised rapidly without revolving in the filtering-chamber A.

The lower end of the filter-chamber A is fitted with a grid or grate, $r$, strong enough to sustain the bed or mass of filtering material against the pressure, and this grid is covered by a perforated plate, $r'$, Fig. 6, over which a sheet of cloth (flannel by preference) is stretched. The filtered liquor escapes from the lower end of the filtering-chamber by a lateral opening. The liquid tends to pass more slowly through the filter-bed toward the center of the filter-chamber than toward its periphery. In order to counteract this tendency, the bottom of the filter-bed is arched upward, or convex at its upper side, so as to reduce the thickness of the filter-bed toward and at its center, and thus, by reducing the resistance to the passage of the liquid, to facilitate the passage of liquid toward and at the same. The liquid also tends to pass downward between the wall of the filter-chamber and the filter-bed, and thus escape filtration. In order to counteract this tendency, the grid r of the filter-bottom is made of smaller size than the filter-chamber, thus forming between the grid and the wall a peripheral pocket, x, which is filled with filtering material, which the liquid that passes down the wall of the filter-chamber is compelled to traverse before it can escape through the grid, thereby insuring the filtration of that liquid. The convex grid r may be replaced by its equivalent, such an equivalent being a perforated cylinder applied transversely of the filtering-chamber over a solid bottom, and fitted with an exit-pipe which is passed through the bottom or the wall of the filtering-chamber for the discharge of the filtered liquor from the interior of the perforated cylinder.

The cloth which covers the bottom of the filter-chamber is secured in place by means of a clamp-ring, y, Fig. 6, which is held to the said bottom by bolts z; and we prefer to place an india-rubber gasket over the rim of the cloth before applying the clamp-ring, so as to equalize the strain upon the cloth and insure its contact with the said bottom.

When the apparatus is to be charged with the filtering material, the cover and the cutter-head are raised up, and the filtering material is introduced into the filtering-chamber, and is packed therein with greater or less compactness, depending upon the nature of the filtering material used. The cutter-head and cover are then lowered, and the former rests upon the filter-bed. The cover is secured in place by bolts, and the liquid to be filtered is introduced into the tubular piston-rod B by means of a flexible hose, F, and is distributed over the filter-bed from the perforations in the bottom a of the cutter-head. The gearing is set at work, so as to revolve the cutter-head, and the action of the differential gear causes the progressive depression of the cutter-head in the filtering-chamber, and causes the blade to pare off the surface of filtering material which becomes saturated with foul matter. The foul matter thus pared off passes through the opening of the cutter-head in which the blade is secured, and is transposed to the upper side of the cutter-head, so that it is out of the way of the liquid which issues from the perforated bottom of the cutter-head. The operation proceeds until the cutter-head approaches the bottom of the filter-chamber so closely that the thickness of filtering material left between the two is insufficient for filtration. Then the motion of the cutter-head is stopped, (by shifting the driving-belt to the loose pulley,) the cover c of the filtering-chamber is unbolted and raised, the clutch P is shifted into engagement with the fixed bearing u, and the revolution of the nut I is recommenced, so as to screw up the cutter-head and lift the mass above it out of the filtering-chamber, after which the latter may be cleansed and charged with a new bed of filtering material. The filtering material employed may be such as is adapted to the liquid to be filtered. The materials which we have used with success are sawdust, fine wood charcoal, charred sawdust, charred spent tan-bark, bone charcoal, and peat charcoal.

The rate at which the cutter-head is depressed may be regulated by making the wheels of the differential gearing with the required number of teeth. Thus the pitch of the screw C may be two-fifths of an inch, so that two and a half revolutions of the nut I would of itself move the cutter-head one inch. If, under such circumstances, the differential gear be so proportioned as to one hundred and one to one hundred, the cutter-head would be depressed one two hundred and fiftieth of an inch at each revolution, and if the nut be revolved five revolutions per minute, and there be thirty inches in depth of filter-bed to be transposed, twenty-five hours would be consumed in filtration before the filter-bed required renewal. By varying the number of teeth of the differential gear, the above rate of descent of the cutter-head may be increased or decreased.

The form of the uprights O, which connect the cross-head M with the filtering-chamber A, is not a matter of indifference. We make them inclined toward each other, as represented in the drawings, so that by using uprights of different inclinations cross-heads and gear of uniform dimensions may be used with filtering-chambers of different diameters, thus greatly reducing the cost of constructing filtering apparatus of different dimensions and capacities.

Having thus described a machine embodying our invention, we declare the same machine also embodies another improvement, which is set forth in an application for a patent filed by us November 4, 1882. Serial No. 75,908. We therefore do not claim that improvement in this patent; but

We claim as our invention—

1. The combination, substantially as before set forth, of the filtering-chamber with the hollow cutter-head, the perforated bottom thereof, the tubular piston-rod, and the screw.

2. The combination, substantially as before set forth, of the filtering-chamber with the cutter-head, the screw, the tubular piston-rod, and the feed-chest connected with said piston-rod between the screw and the cutter-head.

3. The combination, substantially as before set forth, of the filtering-chamber with the cutter-head, the tubular piston-rod, the feed-chest, and the slide and guide for said chest.

4. The combination, substantially as before set forth, of the cutter-head, the filtering-chamber, and the convex grid at the bottom of the said chamber, constructed of less diame- (No Model.)

E. M. FARR.
HORSE CLEANER.

No. 297,365. Patented Apr. 22, 1884.

WITNESSES:
Donn Twitchell.
C. Sedgwick

INVENTOR:
E. M. Farr
BY
ATTORNEYS.